United States Patent [19]
Chien

[11] Patent Number: 5,879,069
[45] Date of Patent: Mar. 9, 1999

[54] EL LIGHT STRIP DEVICE FOR FOOTWEAR

[76] Inventor: Tseng Lu Chien, 8F, No. 29, Alley 73, Lin-Shen Street, Shi-Chi Town, Taipei, Hueng, Taiwan

[21] Appl. No.: 611,049

[22] Filed: Mar. 5, 1996

[51] Int. Cl.$^6$ ...................................................... F21L 15/08
[52] U.S. Cl. ................................. 362/103; 362/84; 36/137
[58] Field of Search .............................. 362/84, 103, 105, 362/106, 108; 36/136, 137

[56] References Cited

U.S. PATENT DOCUMENTS

| | | |
|---|---|---|
| 2,931,893 | 4/1960 | Arias et al. ................................ 362/103 |
| 3,153,745 | 10/1964 | Gurian et al. . |
| 4,727,603 | 3/1988 | Howard . |
| 4,839,777 | 6/1989 | Janko et al. . |
| 4,848,009 | 7/1989 | Rodgers . |
| 4,895,110 | 1/1990 | LoCascio . |
| 4,935,851 | 6/1990 | Wood . |
| 5,027,259 | 6/1991 | Chujko . |
| 5,149,489 | 9/1992 | Crews . |
| 5,151,678 | 9/1992 | Veltri et al. . |
| 5,245,517 | 9/1993 | Fenton . |
| 5,381,318 | 1/1995 | Fang . |
| 5,430,621 | 7/1995 | Raskas . |
| 5,465,197 | 11/1995 | Chien . |
| 5,513,080 | 4/1996 | Magle et al. ............................. 362/103 |

*Primary Examiner*—Stephen Husar
*Attorney, Agent, or Firm*—Bacon & Thomas, PLLC

[57] ABSTRACT

A lighting arrangement for footwear includes an electro-luminescent strip enclosed within a protective sleeve, the sleeve in turn being situated within a lace or strap of the footwear.

22 Claims, 6 Drawing Sheets

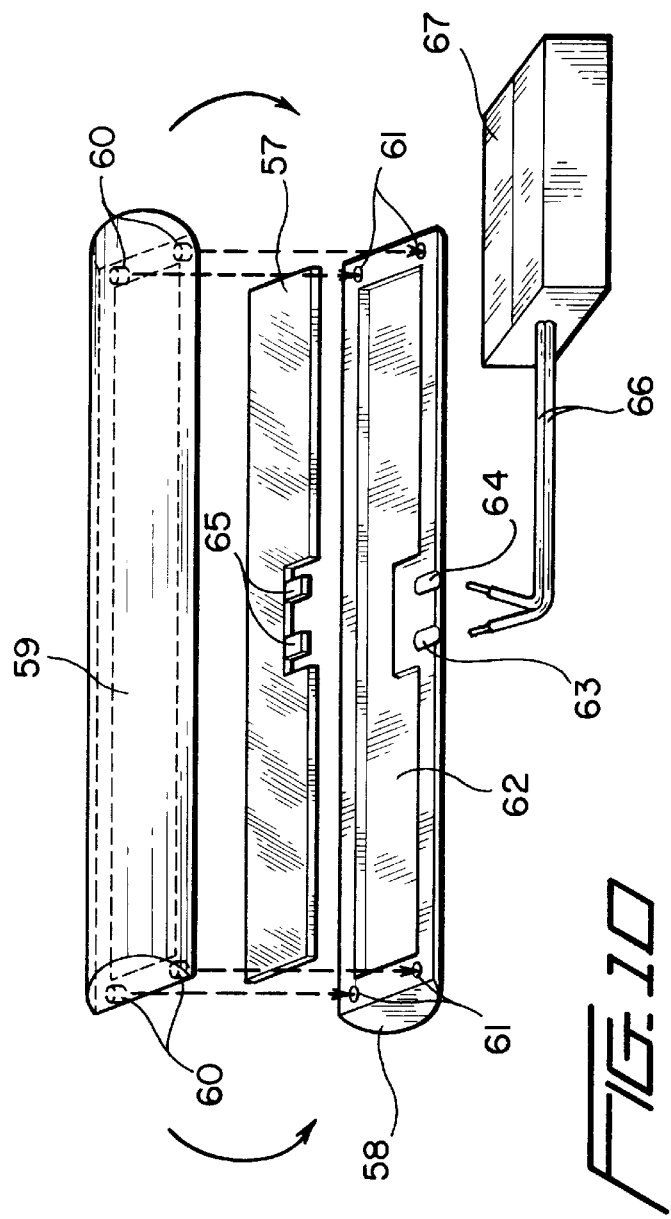
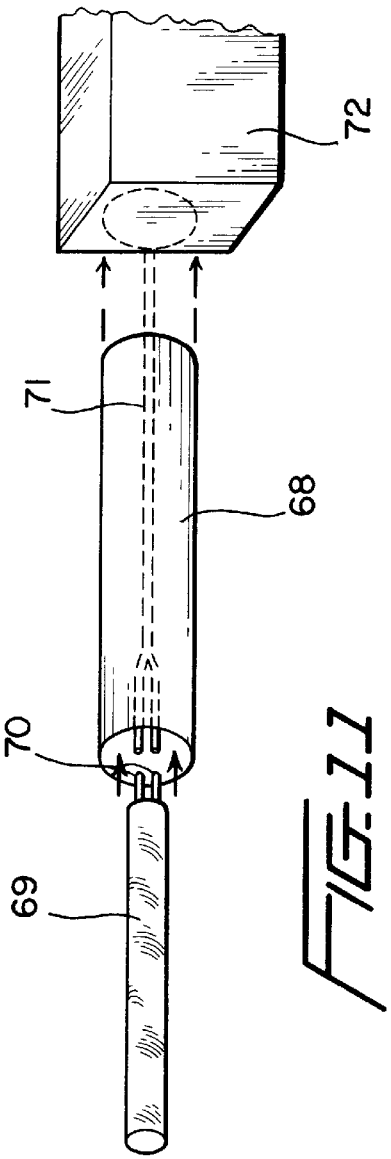

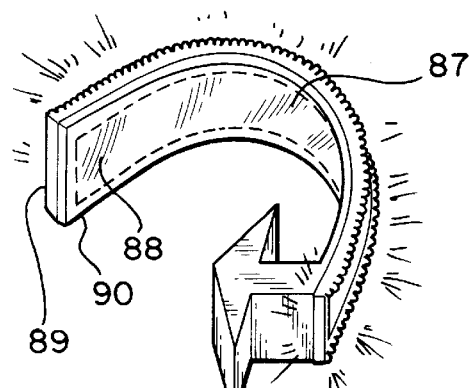
FIG. 16-A
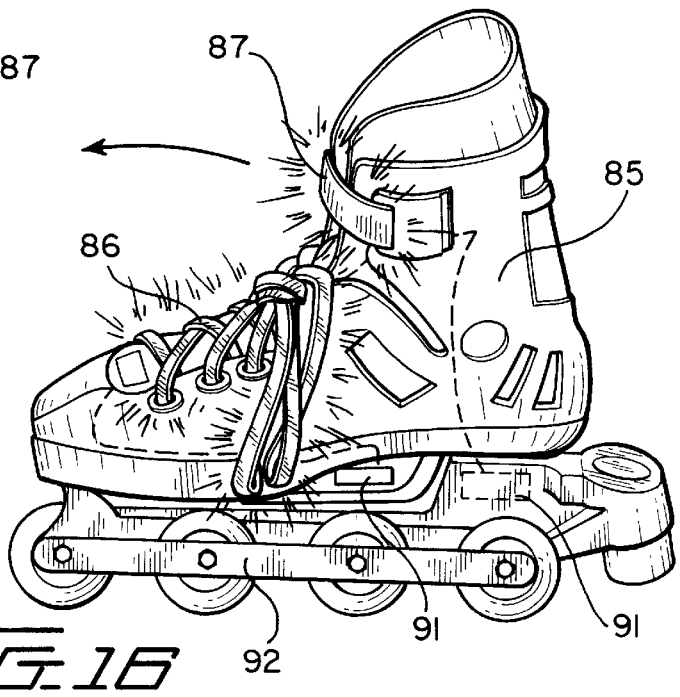
FIG. 16
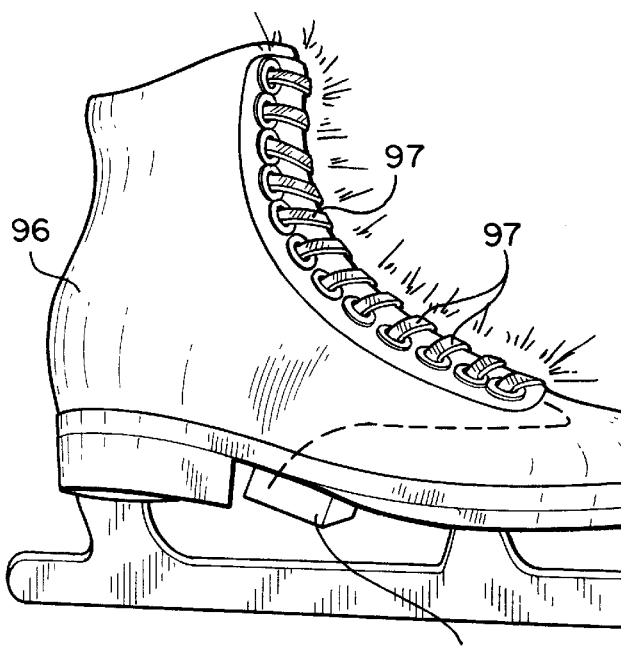
FIG. 18
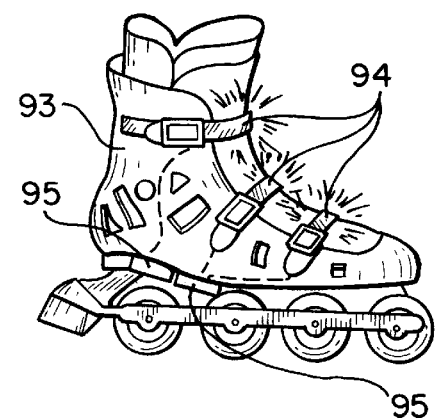
FIG. 17
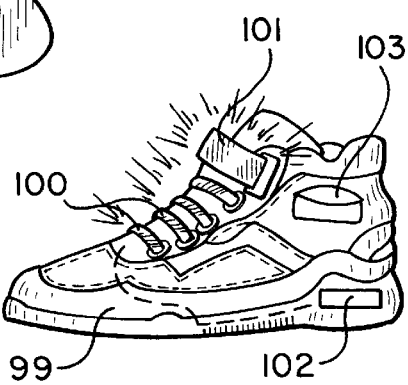
FIG. 19

EL LIGHT STRIP DEVICE FOR FOOTWEAR

BACKGROUND OF THE INVENTION

1. Field of the Invention

This invention relates to illuminated footwear, and in particular to footwear in which super-thin lighting elements are incorporated in a strap or in the laces of the footwear. The phrase "super thin lighting element" refers to a lighting element of the type containing a chemical sandwiched between protective layers, such as an electro-or photo-luminescent strip or panel.

2. Discussion of Related Art

Illuminated footwear have been proposed in a number of prior patent documents, including U.S. Pat. Nos. 4,035,630, 4,173,201, 4,216,464, 4,423,539, 4,425,600, 4,438,482, 4,480,293, 4,599,682, and 4,935,851. Such illuminated footwear offers increased nighttime visibility for the wearer, as well as increasing the attractiveness of the footwear. However, in each of the above-mentioned patents, the illumination is provided by incandescent bulbs or light emitting diode arrangements which have a number of disadvantages and therefore limited practicality in the context of footwear, including high power consumption in the case of incandescent lights, and a narrow viewing angle in the case of light emitting diodes, as well as the problem common to all point source or essentially spherical lighting arrangements that, because the intensity of light decreases distance from a point or spherical light source according to the inverse square law. In the case of light sources small enough to be used on footwear, in the absence of reflective materials or fiber optics to carry the light emitted by the source a further distance, the visibility of the lighting elements is limited to about three or four feet. While reflectors, fiber optics and the like are of course available, the use of visibility enhancing means to increase the visibility of LEDs or incandescent lights beyond three or four feet can greatly increase the cost and assembly time for the footwear, and is generally impractical.

To solve this problem, it has also previously been proposed to use super-thin lighting elements to provide illumination for footwear. In addition to increasing the visibility of lighting arrangements utilizing super-thin lighting elements, the super-thin lighting elements offer a number of advantages over conventional lighting elements such as incandescent light bulbs and light emitting diodes, including flexibility, which allows the lighting elements to follow curves on the object to which they are attached, the ability to be printed or silk-screened with logos, marks, figures, and characters, or to be stenciled or masked, the availability of a wide variety of color choices, including green, blue, pink, yellow, and white, and low assembly and design costs.

The advantages of using super-thin lighting elements in a variety of contexts are explained in several pending U.S. patent applications and issued patents of the Inventor. These pending applications, some of which disclose footwear and others of which disclose other types of devices or objects illuminated by super thin lighting elements, in general have in common disclosures of lighting elements which are either applied-directly to the surface of objects and devices, or which are mounted on specially designed brackets or housings. Serial numbers of the pending U.S. patent applications include Ser. Nos. 08/226,322; 08/305,294; 08/343,404; 08/343,915; 08/383,404; 08/383,405; 08/421,647; 08/432, 707; 08/438,373; 08/444,064; 08/436,007; and 08/522,940.

The super-thin lighting arrangements described in the above-cited prior applications, as well as in other prior patents, can be manufactured to have a wide variety of forms by using appropriate processes for coating light emitting pigments onto clear or opaque backing materials to emit light from a single side, both sides, or over 360° to form sheets, tubes, bars, cylinders, spheres, and other shapes. Typical electro-luminescent lighting elements, by way of example, are made of multiple layers having a thickness of less than 0.40 cm total for a single-side illuminated surface sheet, with a few additional millimeters required for multi-sided arrangements. The three dimensional elements can easily be made by a vacuum spraying process to get a lighting element which emits light beams at a variety of angles to permit the observer to see the light at any angle.

The present invention utilizes this design flexibility of super-thin lighting elements by applying them in a novel way in the context of footwear. As indicated above, it is known to use electro-luminescent lighting element in the context of footwear, but in general the lighting elements are simply applied to the surface of the footwear, exposing them to damage, or are including in special housings or mounting brackets, which can be inconvenient, and none of the prior patents or applications suggest the basic concept of the present invention, which is to place the lighting elements in lace assemblies or straps in order to take full advantage of the extended surface area of illumination provided by the lighting elements while placing them in a location which offers protection for the lighting elements, eliminates the need for unnecessary hardware such as mounting brackets for the elements, simplifies manufacture of the shoes since the lighting elements do not need to be separately stitched or bonded to the footwear (the elimination of unnecessary manufacturing steps will become apparent from the detailed description), and offers some "discreetness" for daytime use (such that the lighting elements are primarily visible when illuminating after dark). Also, the lighting elements of the invention can be pre-worked or assembled on a side-line and added to the shoe without holding-up or requiring significant changes to the main assembly line.

SUMMARY OF THE INVENTION

It is accordingly an objective the invention to provide an illumination arrangement for footwear that provides enhanced visibility, manufacturing convenience, useful life, and design flexibility in comparison with conventional footwear illumination arrangements, including previous proposed footwear illumination arrangements involving the use of electro-luminescent lighting elements.

This objective of the invention is achieved, in accordance with a first preferred embodiment of the invention, by utilizing the laces of the footwear as part of the illumination arrangement, and more specifically by providing a footwear illumination arrangement in which the illumination is provided by an electro-luminescent strip enclosed within a protective sleeve, which in turn is enclosed within a lace netting material for use as a lace assembly for the footwear.

The objective of the invention is further achieved, in accordance with a second preferred embodiment of the invention by arranging the laces to avoid over-tolerance bending of the lighting elements through the use of specially designed eyelet covers, including angled and radiused bending edges. To facilitate lacing, the lace assembly may also be narrowed at the turning points.

Alternatively, the objective of the invention is also achieved in accordance with a third preferred embodiment of the invention by sandwiching an electro-luminescent light strip or strips between layers of a fastening or supporting strap of the footwear, with openings or transparent areas in one of the layers through which the lighting element is visible.

Moreover, in accordance with additional preferred embodiments, features, and implementations of the invention, the lighting elements may be connected to a power pack containing a circuit board by wires secured by a wiring harness to a tongue of the footwear, the wiring harness or bracket supporting an activation switch or sensor, such as a photo-sensor, and the circuit board supporting a direct current power source, analog or digital integrated direct-to-alternating current conversion circuitry, and analog or digital integrated control circuitry for causing the lighting elements to flash for special effects. Also, the protective sleeve in which the lighting elements are positioned could be flat or cylindrical in shape, and can be arranged to provide optical effects.

Footwear to which the principles of the invention may be applied include any type of footwear having laces or straps, including but not limited to athletic shoes, sandals, and skates. In addition, although the principles of the invention are especially suitable for application to laces and straps, it may be possible to extend those principles to any elongated footwear part, including purely or primarily decorative straps and piping.

BRIEF DESCRIPTION OF THE DRAWINGS

FIG. 10 is a perspective view showing a footwear illumination arrangement constructed in accordance with the principles of a fifth preferred embodiment of the invention.

FIG. 11 is a perspective view showing a footwear illumination arrangement constructed in accordance with the principles of a sixth preferred embodiment of the invention.

FIG. 16 is a perspective view of a third implementation of the preferred embodiments of the invention.

FIG. 16A is a perspective view of a quick release strap for use in the implementation of FIG. 16.

FIG. 17 is a perspective view of a fourth implementation of the preferred embodiments of the invention.

FIG. 18 is a perspective view of a fifth implementation of the preferred embodiments of the invention.

FIG. 19 is a perspective view of a sixth implementation of the preferred embodiments of the invention.

DETAILED DESCRIPTION OF THE PREFERRED EMBODIMENTS

Figure 1:
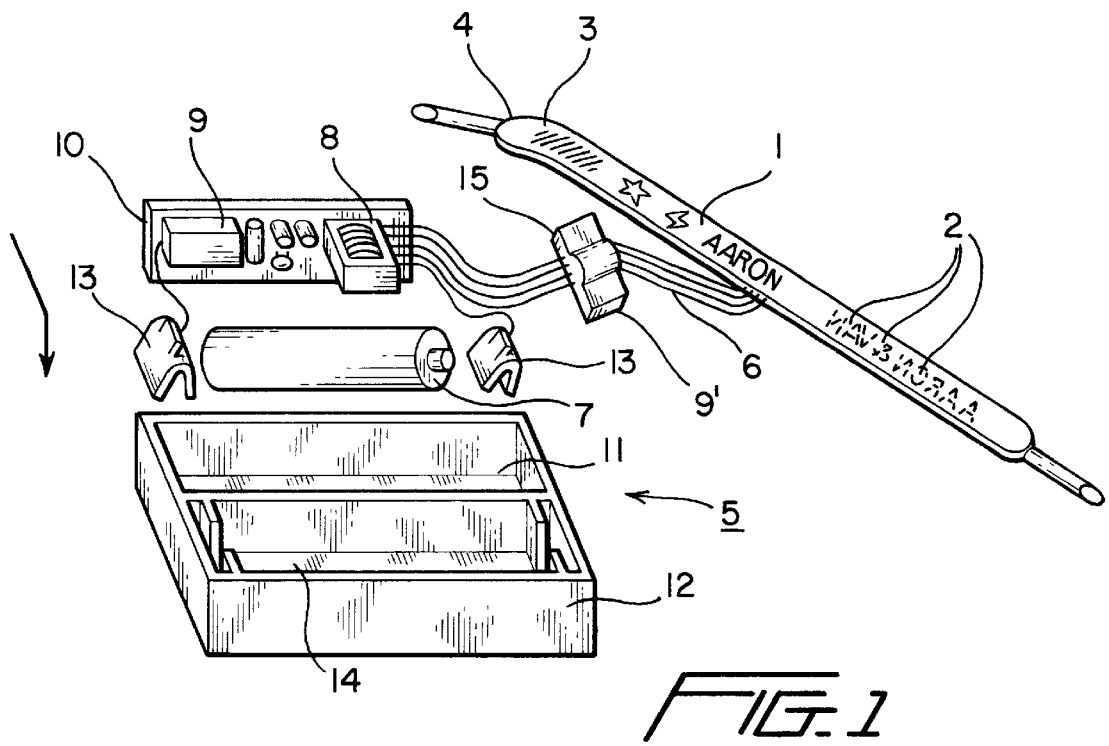
FIG. 1 is a perspective view of a footwear illumination arrangement constructed in accordance with the principles of a first preferred embodiment of the invention.
Figure 1A:
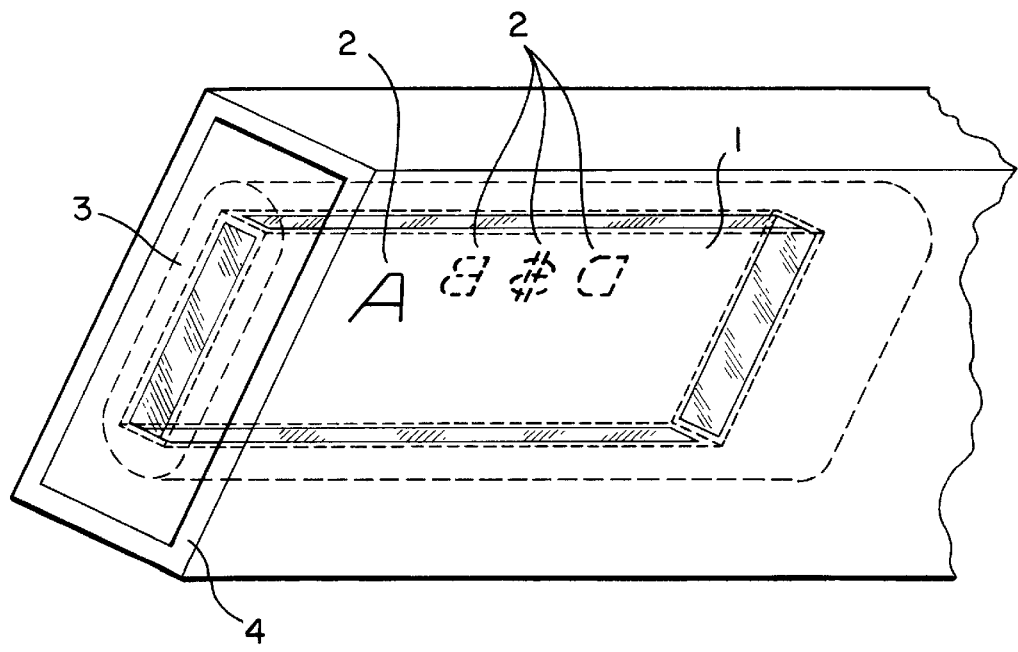
FIG. 1A is a cross-sectional perspective view of a lace assembly for the footwear of FIG. 1.

FIGS. 1 and 1A illustrate a footwear illumination arrangement constructed in accordance with the principles of a first preferred embodiment of the invention. The illumination arrangement includes an electro-luminescent strip 1 in which light is emitted from two surfaces, but in which portions of the strip are non-illuminated to save materials costs. The illuminated portions can be arranged to form logos, figures, messages, or other designs 2 on each side of the strip. The strip is then placed within a transparent protective sleeve 3, which in turn is inserted into a lace material 4. The strip may either be fixed or movable within the sleeve. An example of a suitable lace material is 300 nylon netting, which deforms only slightly when pulled, and is sufficiently open to allow good visibility of the lighting element through the lace material.

Preferably, the electro-luminescent strip can have a plurality of terminals connected to different illuminated areas of the strip, i.e., to areas with different pigment or phosphor coatings, to achieve a variety of lighting effects within the strips, including different colors. Further lighting effects are also achieved by stencilling, silk-screening, or otherwise patterning the outside of the strip.

The electro-luminescent strip 1 is connected to a power pack 5 by wires 6 inserted through gaps in the lace material 4. The power pack 5, as is known, contains a DC power source such as a rechargeable battery 7 selected for environmental friendliness, and a transformer 8 and/or other circuitry 9 for increasing the voltage and converting the direct current battery output to alternating current having a frequency capable of triggering illumination of the electro-luminescent strip. On/off control can be provided by a manual switch, automatic switches such as vibration-responsive, inertial switches, or photo-switches, and/or combinations of different switches, and analog or digital control circuitry can be added for obtaining special multiple element lighting effects, including chasing, fade in/out, random flashing, sequential flashing, or combinations of the above effects. The circuit board 10 is preferably positioned in a compartment 11 of a power pack housing 12, with the battery and terminals 13 being positioned in a second compartment 14, and the wires 6 being secured by a bracket or harness 15. For purposes of convenience, a photo-sensor 9' or other switch can be mounted on the wiring harness 15 rather than on the power pack circuit board since the harness is positioned on an exposed area of the footwear, namely the tongue, whereas the power pack is preferably positioned in a less exposed area.

Figure 2:
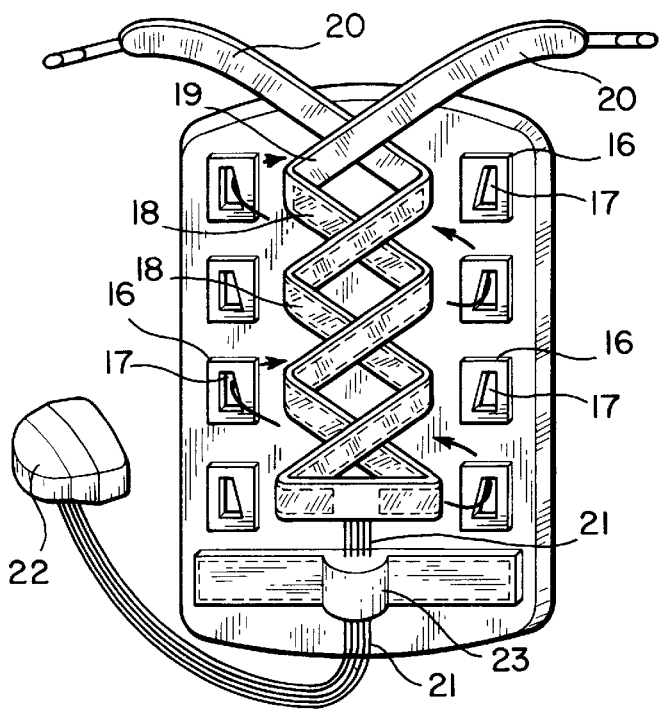
FIG. 2 is a perspective view of a footwear illumination arrangement constructed in accordance with the principles of the second preferred embodiment of the invention.
Figure 2A:
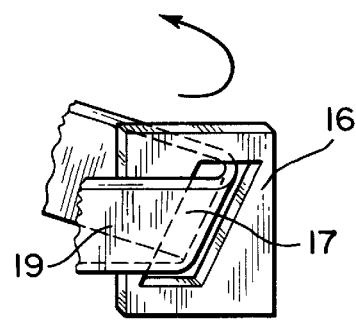
FIG. 2A is a perspective view of an eyelet cover for the illumination arrangement of FIG. 2.

As illustrated in FIG. 2, a footwear lighting arrangement according to a second preferred embodiment of the invention preferably includes a plurality of molded eyelet covers 16 each having an inside surface 17 that is angled transversely to a path of the lace out of the eyelet towards a next eyelet in order to prevent over-tolerance twisting of the electro-luminescent light strip or strips 18 and, as best seen in FIG. 2A, that is radiused to further prevent over-tolerance bending of the light strip or strips. In this example, the light strip or strips are again enclosed within a transparent protective sleeve 19 and a lace netting material 20, which can for example be 800D nylon netting. The strip or strips are connected by wires 21 extending through the netting material to a power pack 22 via central harness 23 stitched onto the tongue of the footwear, central harness 23 optionally serving as a mount for a photo-sensor or other light activating sensors or switches.

In this embodiment, the lace containing the electro-luminescent light strips is centrally positioned relative to the harness and has an even length extending on two sides of the harness to pass through each of the molded eyelets from the lower to the upper eyelets. Preferably, the lace does not include any fixed elements other than the center electrical terminals connected to wires 21, as a result of which the lighting elements can maintain an ideal location. A typical number of eyelets is 3 to 4, with a path length for the lace of around 10" on each side of the tongue, so that a total strip length of 20" is sufficient, with the remainder of the lace being un-illuminated since this portion of the lace will normally be covered by the wearer's clothing, the extra length allowing the laces to be tied without twisting the lighting elements.

Figure 3:
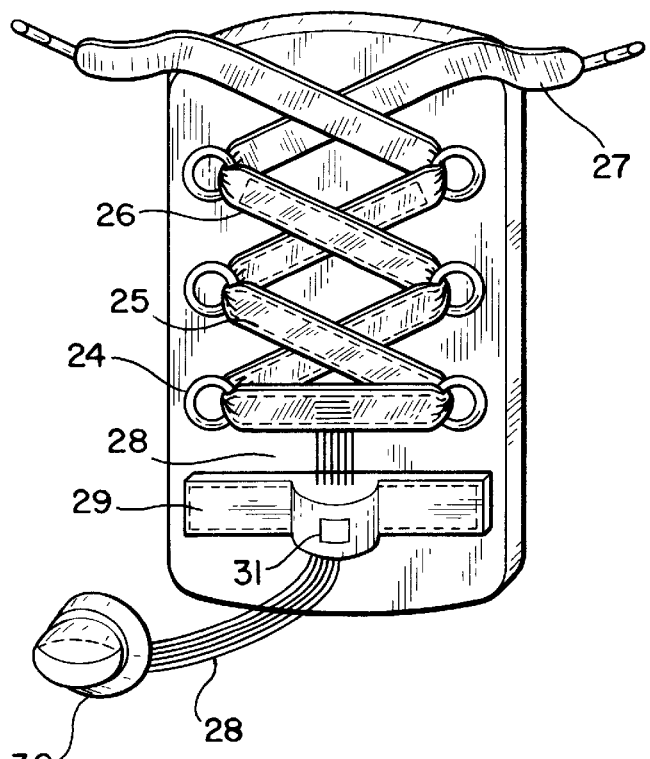
FIG. 3 is a perspective view of a footwear illumination arrangement constructed in accordance with the principles of a third preferred embodiment of the invention.

In a third preferred embodiment of the invention, as illustrated in FIG. 3, the lighting arrangement of the invention can be adapted for use with conventional footwear having round metal or plastic eyelets 24 by positioning strips 25 so that they only extend between the eyelets, and by narrowing or eliminating the cushioning sleeve at points corresponding to the turning points of the lace material 27 in the eyelets, to thereby increase the permissible bending radius of the lace. Again, in this embodiment, the lace/lighting element assembly includes central terminals to which wires 28 are connected, the wires extending through a harness 29 to a power pack 30, and the harness having positioned thereon a light sensor 31.

Figure 4:
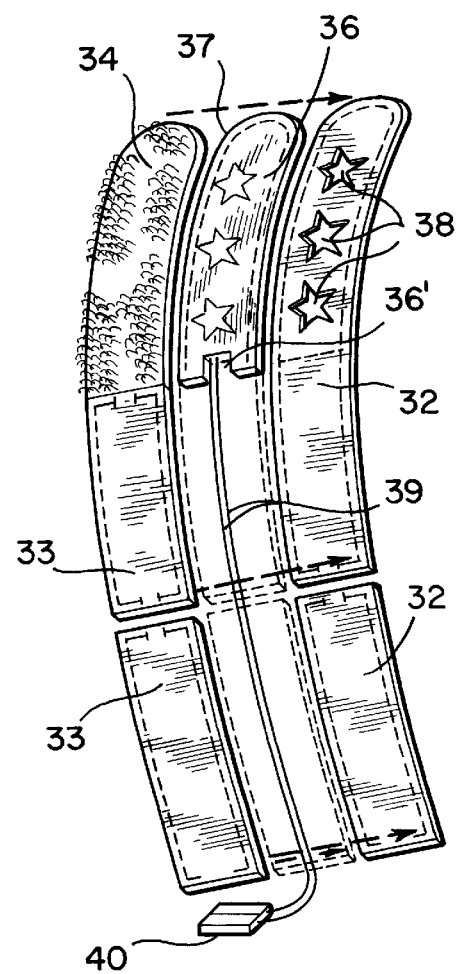
FIG. 4 is a perspective view of a footwear illumination arrangement constructed in accordance with the principles of a fourth preferred embodiment of the invention.
Figure 5:
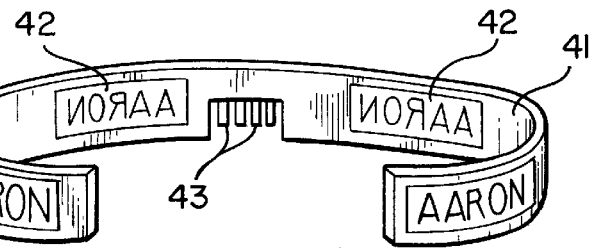
FIGS. 5–9 are perspective views showing variations of the electro-luminescent strips used in the footwear illumination arrangements of FIGS. 1–4.

In a fourth preferred embodiment of the invention, as illustrated in FIG. 4, the lighting element is placed on the straps of a sandal rather than on a shoelace. The straps of the sandal are conventionally constructed of a thick supporting layer 32 and a soft cushioning layer 33, with the front fastening strap further including a layer 34 of fastening material bonded by stitching to the soft cushioning layer 33. The fastening layer may for example consist of a VEL-CRO™ hook and loop fastener.

The two layer construction of the strap permits the illumination strip or strips 36 and protective sleeve 37 to be sandwiched between the layers and secured upon stitching of the layers together as indicated by the dashed lines along the perimeter of the various layers illustrated in FIG. 4. The light strip or strips can then be viewed through windows or openings 38 of any desired shape cut into the supporting layer, or through a transparent portion of the supporting strap, which can alternatively be made entirely of a transparent material. In this embodiment, instead of center terminals, the strip is provided with end terminals 36' and the wires 39 are run between the layer of the strap to a power pack 40 situated outside the strap. Those skilled in the art will note that this arrangement is highly advantageous from a manufacturing point of view because the lighting element is secured during the normal course of stitching the layers together, without requiring any additional stitching or bonding in order to secure the lighting element in place.

FIGS. 5–9 illustrate variations of electro-luminescent strip arrangements that can be used in connection with the above embodiments. In the variation illustrated in FIG. 5, the electro-luminescent light strip 41 has electro-luminescent material partially coated to form a logo 42 visible from one side and also non-illuminated areas to save power and materials costs. The terminals 43 for the lighting element are in the center of the strip and therefore the strip is especially suitable for use in shoelace embodiments of the type illustrated in FIGS. 1–3.

Figure 6:
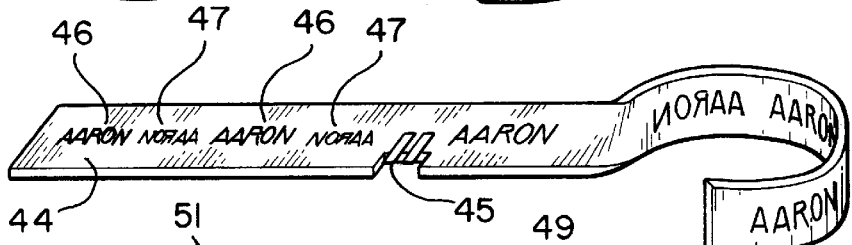
Figure 7:
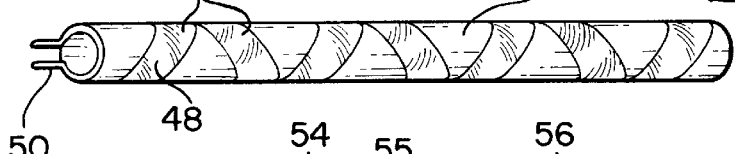
Figure 8:
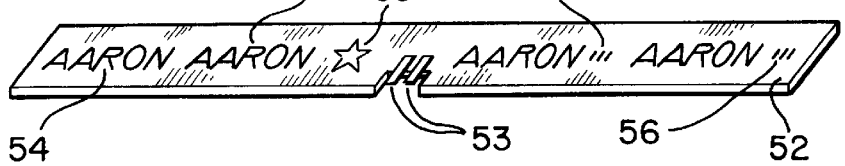
Figure 9:
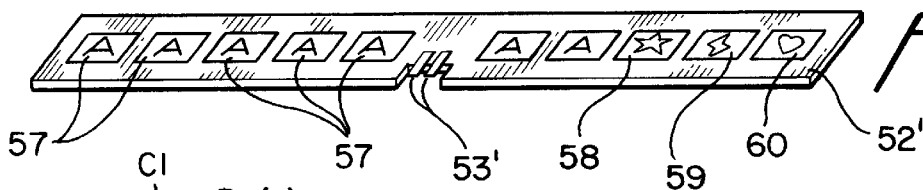

In the variation illustrated in FIG. 6, an electro-luminescent light strip 44 having center terminals 45 is partially coated to form logos 46 and 47 visible from two sides, while in the variation illustrated in FIG. 7, the electro-luminescent light strip 48 is in the form of a cylinder 49 having end terminals 50 and areas 51 coated with electro-luminescent material that can emit light beams to 360°, and in the variations illustrated in FIGS. 8 and 9, the electro-luminescent light strips 52 and 52' having center terminals 53 and 53' are illuminated on one side, but with areas 54–56 of multiple colors and different designs.

In a fifth preferred embodiment of the invention, illustrated in FIG. 10, the electro-luminescent light strip 57 is positioned in a cylindrical protective sleeve made up of two parts 58 and 59 arranged to snap together by means of posts 60 and openings 61, or by any other suitable fasteners, with the lower part 58 including a recess 62 for accommodating the strip and further recesses 63 and 64 for respectively accommodating terminals 65 and permitting exit of wires 66 so that the electro-luminescent strip can be connected to a power pack 67. This embodiment has the advantage that one or both parts 58 and 59 of the sleeve can be arranged to provide optical effects such as increasing the viewing angle for the strip by magnifying light emitted by the strip and, because it includes center terminals, can be used for example in the embodiments of FIGS. 1–3. Although illustrated as cylindrical, however, those skilled in the art will appreciate that the sleeve of this embodiment can have any three-dimensional shape.

In a variation of the embodiment illustrated in FIG. 11, a cylindrical cushioning sleeve 68 is provided, but the electro-luminescent strip is replaced by a cylindrical lighting element 69 similar to the one illustrated in FIG. 7. In this embodiment, lighting element has end terminals 70 connected to wires 71, and thus could be fitted into a strap or similar structure 72.

Figure 13:
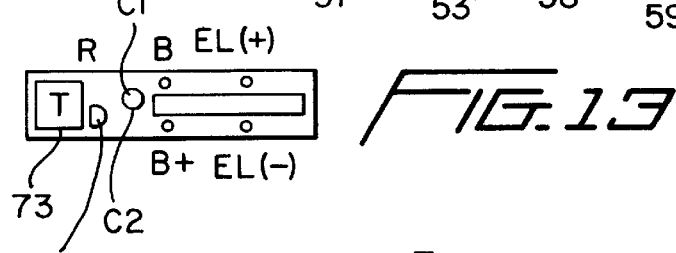
FIG. 13 is a plan view of a circuit board layout for the circuit of FIG. 12.
Figure 12:
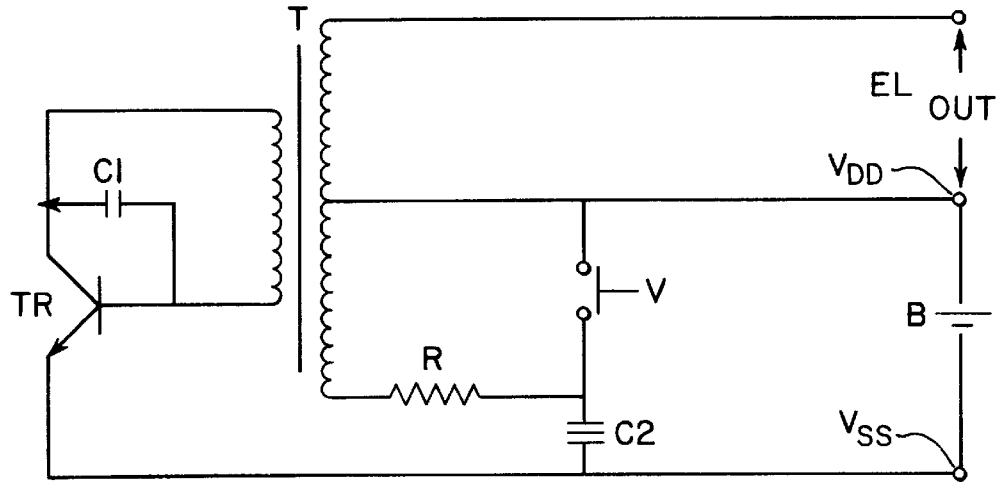
FIG. 12 is a schematic circuit diagram showing a power supply circuit for use in the footwear illumination arrangements of the preferred embodiments.

FIGS. 12 and 13 illustrate an exemplary control circuit for the lighting arrangements of the preferred embodiments of the invention. It will of course be appreciated by those skilled in the art that the circuit may be varied in numerous different ways. The components may for example include, as illustrated, in FIG. 12, a switch V, a battery B having voltage $V_{DD}$—$V_{SS}$, DC-AC conversion circuitry including a transistor/capacitor oscillator made up of capacitor C1, transistor TR, capacitor C2 and resistor R, a transformer T, and an output, with each of the components being positioned on a circuit board 73.

Figure 14:
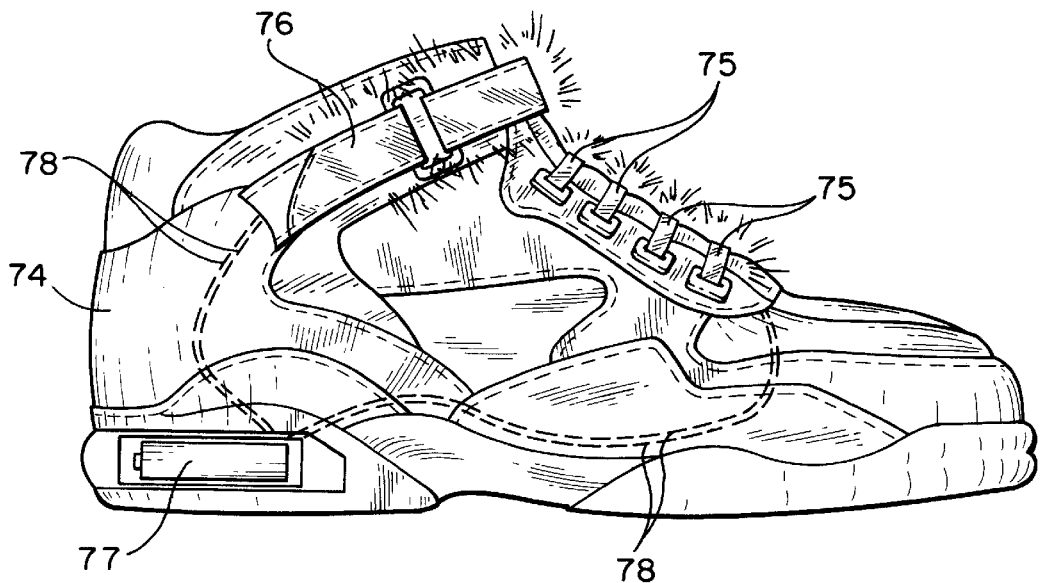
FIG. 14 is a perspective view of a first implementation of the preferred embodiments of the invention.

Turning now to illustration of various specific implementations of the above-described preferred embodiments of the invention, FIG. 14 shows a first implementation of the preferred embodiments of the invention, in which the footwear is in the form of an athletic shoe 74 illuminated by electro-luminescent lace assemblies 75 of the type disclosed in FIGS. 1–3, and an illuminated fastening strap 76 similar to the one illustrated in FIG. 4. In this embodiment, the power supply 77 is inside the outsole of the shoe and is connected to the electro-luminescent strips within the lace assembly and straps by wires fastened to an interior surface of the shoe.

Figure 15:
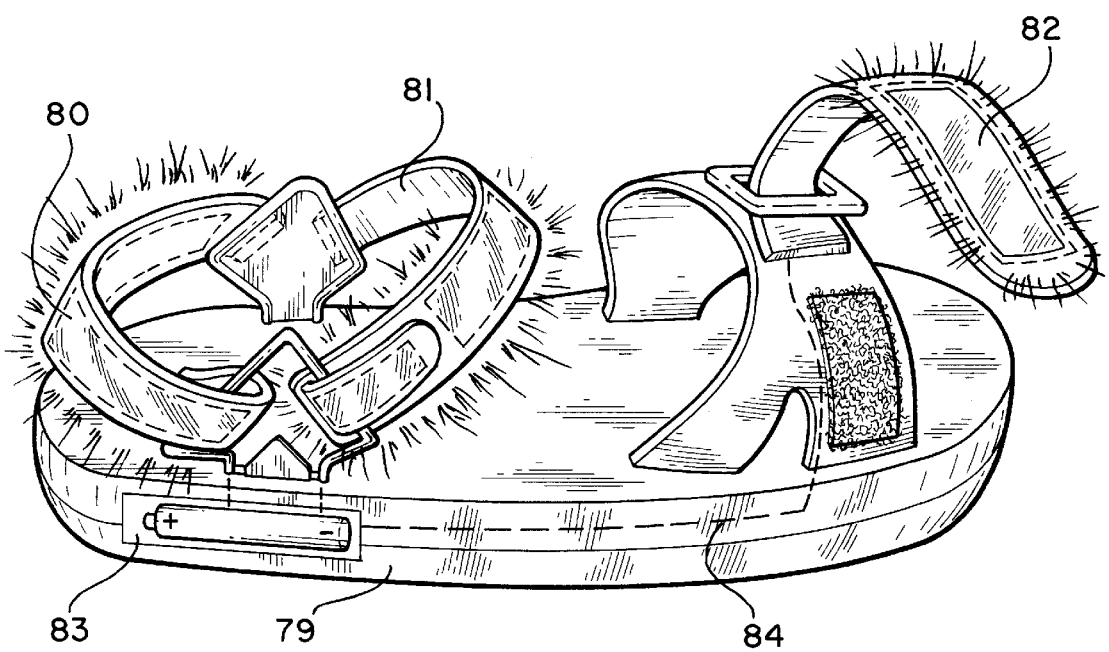
FIG. 15 is a perspective view of a second implementation of the preferred embodiments of the invention.

FIG. 15 shows a second implementation of the preferred embodiments of the invention, in which the footwear is in the form of a sandal 79 illuminated by placing electro-luminescent strips on an ankle strap 80, and on front and rear fastening straps 81 and 82 of the type illustrated in FIG. 4, and the power pack 83 is positioned inside the outsole of the sandal and connected to the electro-luminescent strips by wires 84.

FIG. 16 shows a third implementation of the preferred embodiments of the invention, in which the footwear is in the form of a boot 85 for an in-line skate illuminated by electro-luminescent lace assemblies 86 of the type illustrated in FIGS. 1–3 and a quick release buckle strap 87 made up of an electro-luminescent strip 88 sandwiched between two layers 89 and 90 of the strap, illustrated in greater detail in FIG. 16A, and in which separate power packs 91 for the lace assemblies and the buckle strap are positioned inside of the lower skate bracket 92.

FIG. 17 shows a fourth implementation of the preferred embodiments of the invention, in which the footwear is in the form of an in-line skate 93 having multiple quick-release buckle straps 94 of the type illustrated in FIG. 16-A and multiple power packs 95 positioned under the boot of the skate.

FIG. 18 shows a fifth implementation of the preferred embodiments of the invention, in which the footwear is in the form of an ice-skate 96 illuminated by electro-luminescent lace assemblies 97 of the type illustrated in FIGS. 1–3 and in which the power pack 98 is positioned under the boot of the skate.

Finally, FIG. 19 shows a sixth implementation of the preferred embodiments of the invention, in which the footwear is in the form of an athletic shoe 99 illuminated by electro-luminescent lace assemblies 100 and a fastening strap 101, and in which the electro-luminescent strips in the lace assemblies and fastening strap are respectively connected to a power pack 102 in the outsole and a power pack 103 in an upper portion of the shoe.

It will be noted by those skilled in the art that the straps in which the lighting element is placed may be either functional or decorative, and that the straps may be secured to the footwear by means of eyelets or by other means as desired.

Having thus described several different preferred embodiments of the invention, as well as a number of different implementations of the preferred embodiments, those skilled in the art will appreciate that numerous variations and modifications of the preferred embodiments and implementations thereof may nevertheless be made without departing from the scope of the invention. It is accordingly intended that the invention not be limited by the above description or accompanying drawings, but that it be defined solely in accordance with the appended claims.

We claim:

1. An illumination device for footwear having an elongated part, comprising:

an electro-luminescent lighting element enclosed within an at least partially transparent protective sleeve, the protective sleeve further being enclosed within the elongated part of the footwear;

means including an electric circuit, at least one switch, and a power source for supplying electricity via wires to said electro-luminescent lighting element.

2. An illumination arrangement as claimed in claim 1, wherein the elongated part of the footwear is a lace, and the protective sleeve is surrounded by lace material, the lighting element being connected to the electric circuit by means of wires extending through the lace material.

3. An illumination arrangement as claimed in claim 2, wherein the lace material is a nylon netting material.

4. An illumination arrangement as claimed in claim 2, wherein the footwear includes respective eyelets having angled edges arranged transversely to paths of the lace out of the respective eyelets in order to prevent over-tolerance bending of the lighting element.

5. An illumination arrangement as claimed in claim 4, wherein said angled edges have curved surfaces to prevent damage to the lighting element.

6. An illumination arrangement as claimed in claim 1, wherein the elongated part of the footwear is a strap, and the lighting element is sandwiched between layers of the strap with one of the layers having a portion through which the lighting element is visible.

7. An illumination arrangement as claimed in claim 6, wherein the lighting element is secured in the strap by stitching the layers of the strap together.

8. An illumination arrangement as claimed in claim 1, wherein the lighting element is connected to the electric circuit by wires, and the electric circuit is mounted in a housing together with the power source.

9. An illumination arrangement as claimed in claim 8, wherein the wires are held in place by a harness bracket attached to a tongue of the footwear.

10. An illumination arrangement as claimed in claim 8, wherein the at least one switch includes a photo-sensor.

11. An illumination arrangement as claimed in claim 8, wherein the electric circuit includes direct to alternating current conversion circuitry, and control circuitry selected from the group consisting of analog circuitry and integrated digital circuitry.

12. An illumination arrangement as claimed in claim 1, wherein the lighting element includes an electro-luminescent strip having two opposite sides, and wherein first portions of said two opposite sides are illuminated and second portions of said two opposite sides are not illuminated.

13. An illumination arrangement as claimed in claim 1, wherein the lighting element is a three dimensional electro-luminescent element having first portions that are illuminated and second portions that are not illuminated.

14. An illumination arrangement as claimed in claim 1, wherein different portions of the lighting element, made up of coatings selected from the group consisting of conductive pigments or phosphors, are connected to separate electrical terminals to achieve a variety of lighting effects within the element.

15. An illumination arrangement as claimed in claim 13, wherein further patterning is achieved by adding designs to an exterior surface of the lighting element.

16. An illumination arrangement as claimed in claim 1, wherein the protective sleeve is a three-dimensional member in which the lighting element is at least partially enclosed.

17. An illumination arrangement as claimed in claim 16, wherein the three-dimensional member exhibits optical effects.

18. An illumination arrangement as claimed in claim 1, wherein the elongated part of the footwear is a shoelace, and wherein the lighting element extends over only a portion of the elongated part said portion of the elongated part passing through eyelets of a shoe, thereby leaving ends of the shoelace free for tying.

19. An illumination arrangement as claimed in claim 1, wherein the footwear is selected from the group consisting of a shoe, a boot of a skate, and a sandal.

20. An illumination arrangement as claimed in claim 1, wherein the electro-luminescent lighting element includes conductive layers and phosphors arranged over a portion of the lighting element.

21. An illumination arrangement as claimed in claim 1, wherein the electro-luminescent lighting element is movable within the protective sleeve.

22. An illumination arrangement as claimed in claim 1, wherein the footwear part is a decorative strap.

* * * * *